United States Patent [19]
Brederveld et al.

[11] Patent Number: 5,898,679
[45] Date of Patent: Apr. 27, 1999

[54] WIRELESS RELAY WITH SELECTIVE MESSAGE REPEAT AND METHOD OF OPERATION THEREOF

[75] Inventors: Loeke Brederveld, Meerkerk; Jan Hoogendoorn, Veenendaal; Hendrik Moelard, Maarssen; Leo Monteban, Nieuwegein; Rienk Mud, Wijk bij Duurstede, all of Netherlands

[73] Assignee: Lucent Technologies Inc., Murray Hill, N.J.

[21] Appl. No.: 08/775,238

[22] Filed: Dec. 30, 1996

[51] Int. Cl.$^6$ ................. H04B 7/14; H04J 1/10; H04J 3/08
[52] U.S. Cl. ............ 370/315; 370/401; 455/11.1; 371/33
[58] Field of Search ................. 370/315, 316, 370/328, 338, 401, 400; 455/11.1, 524; 371/32, 33

[56] References Cited

U.S. PATENT DOCUMENTS

| | | | |
|---|---|---|---|
| 4,882,765 | 11/1989 | Maxwell et al. | 370/315 |
| 5,406,561 | 4/1995 | Arai | 370/315 |
| 5,710,764 | 1/1998 | Yoshimura et al. | 370/315 |
| 5,734,643 | 3/1998 | Rondeau | 370/315 |

*Primary Examiner*—Ajit Patel

[57] ABSTRACT

For use in a wireless computer network having a radio relay capable of transmitting messages, a system and method, operable with the radio relay, for selectively repeating a unicast message received from a source end-station only upon some indication that a destination end-station has not received the message. The system includes: (1) a transceiver that receives the unicast message from the source end-station and (2) control circuitry, coupled to the transceiver, that determines whether the destination end-station has received the unicast message and causes the transceiver to refrain from repeating the unicast message if the destination end-station has received the unicast message, the radio relay thereby freed from repeating already-received unicast messages.

18 Claims, 8 Drawing Sheets

WIRELESS RELAY WITH SELECTIVE MESSAGE REPEAT AND METHOD OF OPERATION THEREOF

TECHNICAL FIELD OF THE INVENTION

The present invention is directed, in general, to a wireless computer network and, more specifically, to systems and methods for selectively repeating messages in a wireless computer network.

BACKGROUND OF THE INVENTION

Computer systems configured as local area networks ("LANs") have been common for nearly two decades and are popular in a wide variety of business and educational applications. The most common LANs comprise a number of processing devices and a server that are coupled together by a hard-wired connection. Since about 1990, however, wireless LANs have become more common in the marketplace. Although the concept behind wireless LANS had been described a decade earlier, interest in LAN networks was limited until the release of the 2.4 GHz unlicensed band for industrial, scientific and medical ("ISM") applications. Wireless LAN products most often employ either direct sequence spread spectrum ("DSSS") or frequency-hopping spread spectrum ("FHSS") techniques to communicate between roaming mobile stations and network access points.

In a typical wireless computer network environment, the "backbone" of the LAN takes the form of one or more central servers that communicate with a number of network access points ("APs") through a hard-wired connection. Each AP includes a transceiver for communicating with at least one roaming mobile station ("MS"). The mobile station may be a point-of-sale terminal (e.g., an electronic cash register), a bar code reader or other scanning device, or a notepad, desktop or laptop computer. Each MS establishes a communication link with an AP by scanning the ISM band to find an available AP. Once a reliable link is established, the MS interacts with other mobile stations, a server or both. This allows the user of the MS to move freely in the office, factory, hospital or other facility where the wireless LAN is based, without the length of a hard-wired connection to the LAN limiting the movement of the MS user.

Many wireless LANs incorporate radio relays (functioning as repeaters) to relay messages from one mobile station to another mobile station (peer-to-peer traffic) or from a mobile station to an access point. This allows the communication link to be maintained even if the distance between the two communicating end-stations (whether mobile station or access point) is greater than the range of the transceiver of either or both devices. This also allows the communication link to be maintained even when a radio block obstructs the path between the two end-stations.

In most cases, however, a conventional radio relay blindly repeats any wireless message that it receives. This has the unfortunate drawback of consuming already limited radio bandwidth in those cases where the two end-stations that are communicating are within direct radio range of each other. In such a case, the repeated message is redundant and time-consuming. This situation is exacerbated when an end-station improperly receives the message, as when a redundancy check fails, and the receiver requests that the message be retransmitted. The radio relay repeats the retransmitted message, thereby consuming even more bandwidth.

Accordingly, there is needed in the art for systems and methods that selectively repeat transmitted messages in a wireless computer network only upon some indication that the destination end-station has not received a message. There exists a further need in the art for systems and methods that selectively repeat transmitted messages in a wireless computer network only upon an indication that the destination end-station has not received a message error-free.

SUMMARY OF THE INVENTION

To address the above-discussed deficiencies of the prior art, the present invention provides, for use in a wireless computer network having a radio relay capable of transmitting messages, a system and method, operable with the radio relay, for selectively repeating a unicast message received from a source end-station only upon some indication that a destination end-station has not received the message. The system includes: (1) a transceiver that receives the unicast message from the source end-station and (2) control circuitry, coupled to the transceiver, that determines whether the destination end-station has received the unicast message and causes the transceiver to refrain from repeating the unicast message if the destination end-station has received the unicast message, the radio relay thereby freed from repeating already-received unicast messages.

The present invention therefore recognizes that indiscriminate repeating of unicast messages by radio relays, while simple to implement, represents a considerable and completely avoidable waste of wireless computer network resources. The present invention responds by basing a decision of whether to repeat on whether the destination end-station has received the unicast message. If so, the radio relay refrains from wirelessly repeating the message, thereby covering situations in which the destination end-station is in direct range of the source end-station. If not, the radio relay wirelessly repeats the message so the destination end-station can receive it.

In one embodiment of the present invention, the control circuitry determines whether the destination end-station has received the unicast message by monitoring the transceiver for receipt of an acknowledgment from the destination end-station. In an embodiment to be illustrated and described, the present invention can operate in a wireless LAN environment, wherein Wireless InterFrame Spaces ("WIFS") separate individual messages. The WIFS provide a time period within which the radio relay and the destination end-station can acknowledge messages with BLEEP signals: R-BLEEPS and S-BLEEPS for radio relays and stations, respectively.

In one embodiment of the present invention, the destination end-station refrains from acknowledging the unicast message if the destination end-station fails to confirm that the unicast message is error-free. By so refraining, the radio relay repeats the unicast message, thereby giving the destination end-station a better opportunity to receive the message.

In one embodiment of the present invention, the control circuitry is capable of causing the transceiver to acknowledge the unicast message, the control circuitry causing the transceiver to refrain from acknowledging the unicast message if the control circuitry fails to confirm that the unicast message is error-free. In a manner analogous to that of the embodiment previously described, the radio relay can refrain from acknowledging the unicast message if it was received with errors. Conventionally, the source end-station retransmits the message, thereby giving the radio relay a second opportunity to receive the message.

In one embodiment of the present invention, the control circuitry causes the transceiver to repeat a multicast message received from the source end-station without regard as to whether the destination end-station has received the multicast message. Under current wireless computer network protocols, multicast messages are not acknowledged. Therefore, the present invention does not selectively repeat such messages.

In one embodiment of the present invention, the control circuitry is coupled to a wire-based LAN via a bridge, the control circuitry transmitting the unicast message to the LAN via the bridge without regard as to whether the destination end-station has received the unicast message. The LAN is therefore able to process the message in any desirable manner.

In one embodiment of the present invention, the control circuitry is coupled to a wire-based LAN via a bridge, the LAN receiving the unicast message from the control circuitry via the bridge without regard as to whether the destination end-station has received the unicast message, the LAN further searching a bridge filter table associated therewith for a destination address corresponding to the destination end-station. The LAN may employ the bridge filter table to determine a logical location within the LAN at which the destination end-station may be located. This furthers routing of the message within the LAN.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
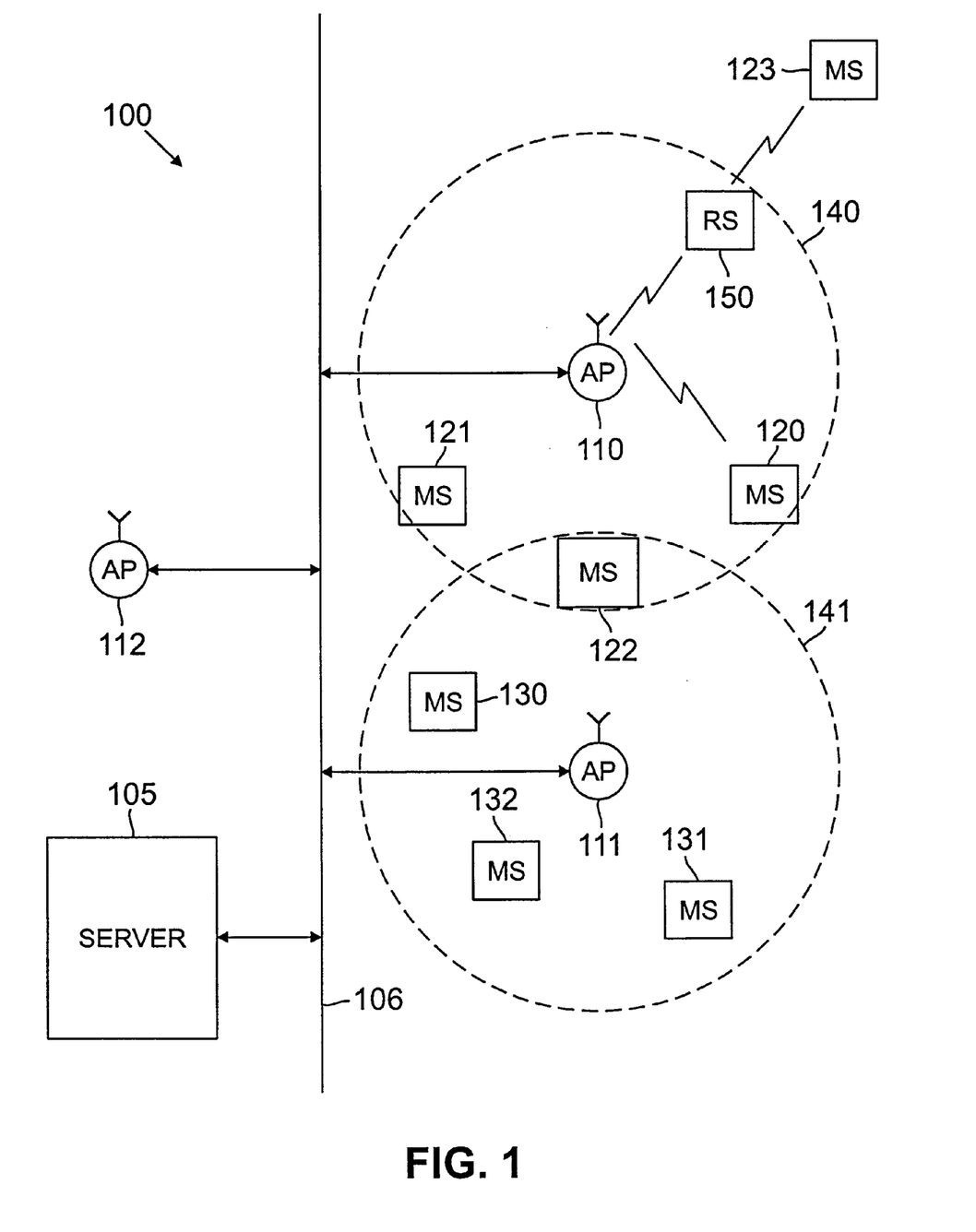
FIG. 1 is a topological diagram of a wireless computer network.

Referring initially to FIG. 1, illustrated is the topology of wireless computer network 100. Server 105 of wireless network 100 communicates bi-directionally with access points 110–112 via bus 106, which is typically a hard-wired connection. In other embodiments, server 105 may communicate with one or more of access points 110–112 by wireless link. AP 110–112 also communicate with one or more mobile stations (MS) 120–123 and 130–132 by wireless link. Each access point can transmit data to and receive data from mobile stations that are within the specified broadcast range of the access point. For example, AP 110 and AP 111 have broadcast ranges 140 and 141, respectively.

AP 111 can communicate with MS 130, MS 131, MS 132 and MS 122.

AP 110 can communicate directly with MS 120, MS 121 and MS 122, or indirectly with MS 123 through relay station (RS) 150, as will be explained below in greater detail.

Although the exemplary broadcast coverage areas of AP 110 and AP 111 are circular in shape, it is possible for the broadcast area of an access point to assume other shapes, including hexagonal. The shape and size of the coverage area of an access point is frequently determined by obstructions that prevent the transmission of signals between the access point and a mobile station.

In an exemplary embodiment, network 100 may be a wireless LAN in an office building. Mobile stations 120–122 and 130–132 are typically desktop and/or notebook computers that communicate with a document server, such as server 105, or run payroll or spreadsheet applications in connection with a server. Alternatively, network 100 may be a wireless LAN used to run the operations of a warehouse facility or manufacturing plant. Employees roaming the warehouse or factory floor, or even moving outside the facility, could communicate with a central server using a wide variety of mobile stations. For example, employees could use bar code scanners to send and receive data to/from server 105 through AP 110–112. Still other employees may be roam a facility using notepad devices to update inventory in server 105. In still other embodiments, network 100 may be a wireless LAN in a large department store and mobile stations 120–122 and 130–132 may be electronic cash registers and/or bar code readers.

As mobile stations 120–122 and 130–132 move about in the wireless LAN environment, the mobile stations will enter and leave the coverage areas of different access points. For example, as MS 122 moves from AP 110 towards AP 111, MS 122 will move out of the coverage range of its current access point, AP 110, to the new access point, AP 111. At some point in its movement, MS 122 determines that the signal quality of the link with current AP 110 has degraded below (or at least close to) an acceptable threshold level. When this occurs, MS 110 begins scanning for another AP in order to set up a "handover". The handover causes the communication link with current AP 110 to be broken down and a new link to be established with AP 111. Ideally, the handover will appear seamless to the user of MS 122.

In order to increase the effective coverage range of the mobile stations and access point, and hence the ability of a user to roam, wireless computer network 100 employs one or more relays (or repeaters) that may be incorporated into mobile stations, access points, or both. For example, in FIG. 1, AP 110 can communicate with MS 123 via dedicated relay station (RS) 150, even though MS 123 is beyond broadcast range 140 of AP 110. One or more of the access points or mobile stations may be dedicated relays (such as RS 150) that perform no function other than relaying messages. When relay circuitry is incorporated into an access point, the relay is said to be a "bridging relay". A bridging relay is a combination of a relay and a medium access control (MAC)

level bridge that can retransmit a received message through the air, or can send the received message to its destination through the hard-wired "backbone" of the wireless computer system. Assuming that RS 150 has a broadcast range approximately equal to that of AP 110, it can be seen that using RS 150 to relay messages to/from AP 110 effectively doubles the broadcast range of AP 110.

For the purpose of describing the operation of selective relays in wireless network 100, it will be assumed that MS 122 and RS 150 both function as selective relays (in addition to other possible functions) in accordance with the present invention and that AP 110 functions as a MAC level bridge relay to the wired backbone of computer network 100 in accordance with the present invention. For the purpose of discussion and clarity, various components of computer network 100 may be described as either a "source end-station" or a "destination end-station," whether the component involved is an access point or a mobile station. A source end-station is the original transmitter of an end-station to end-station message. A destination end-station is the ultimate destination of the message transmitted by the source end-station. Also, a "unicast" message is one sent by a single source end-station to a single destination end-station, while a "multicast" message is one sent by a single source end-station to multiple destination end-stations, usually a class of end-stations that may be identified by a multicast address.

Finally, a broadcast message is one sent by a single source end-station to all destination end-stations in computer network 100.

As shown in FIG. 1, MS 120, MS 121 and MS 122 are near the outer limits of the broadcast range of AP 110. Additionally, MS 120 and MS 121 are out of range of one another. If MS 120, acting as a source end-station, transmits a message intended for MS 121, the destination end-station, the signal will not reach MS 121 unless a relay is present. In this case, MS 122 functions as a selective relay and repeats the message transmitted by the source end-station, MS 120, when the relay function of MS 122 determines that there is some indication that MS 121 has not received the message sent by MS 120. Alternatively, the bridging relay function of AP 110 could selectively repeat the message transmitted by MS 120 when the relay function of AP 110 determines that there is some indication that MS 121 has not received the message sent by MS 120. As noted above, RS 150 functions as a selective relay and repeats all message traffic it receives, including messages to and from AP 110 and MS 123.

The "indication" that selective relays in accordance with the present invention look for is a BLEEP signal that is transmitted shortly after the reception of a message and that is sufficiently brief in duration that it fits in the Wireless Inter Frame Space (WIFS) employed by many wireless computer networks. Two "BLEEP" signals are employed by wireless networks according to the present invention. A Relay-BLEEP (R-BLEEP) signal is transmitted by a relay immediately after the end of the message transmitted by the source end-station. A Station BLEEP (S-BLEEP) signal is transmitted by the destination end-station immediately after the end of the time slot reserved for the R-BLEEP signal. Both BLEEP signals notify the source end-station of the reception of the message, as will be described in greater detail below. If neither BLEEP signal is detected by the source end-station, the source end-station will schedule the message for retransmission.

Advantageously, by sending the BLEEP signals in the WIFS, no bandwidth is lost. Selective relays according to the present invention only repeat those messages where no S-BLEEP signal is detected. This saves additional bandwidth, because the selective relay does not repeat messages where the source and destination end-stations are close enough together to enable direct transmission between the source and destination end-stations.

Figure 2:
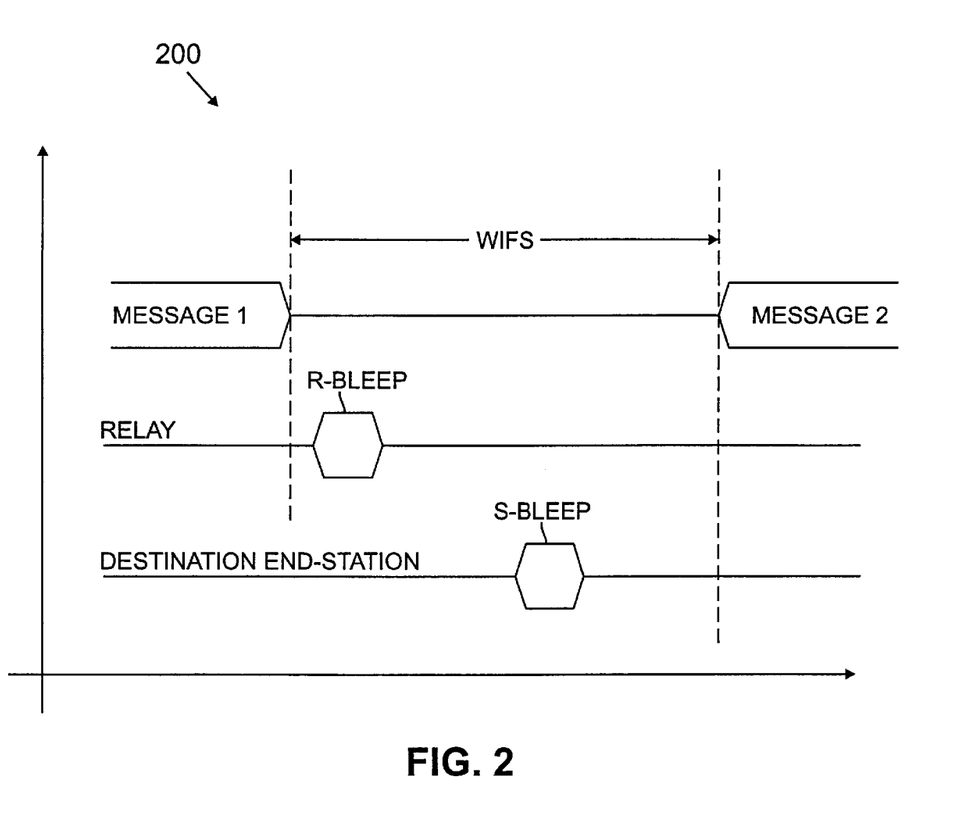
FIG. 2 is a timing diagram depicting the sequence of R-BLEEP and S-BLEEP signals in the wireless interframe space.

Turning now to FIG. 2, there is illustrated a timing diagram 200 depicting the sequence of R-BLEEP and S-BLEEP signals in the Wireless Interframe Space (WIFS) according to one embodiment of the present invention. At the end of transmission of MESSAGE 1, a relay transmits an R-BLEEP signal, indicating to the source end-station that the relay has received the message. After the R-BLEEP signal has passed, the destination end-station transmits an S-BLEEP signal, indicating to the source end-station and to the relay that the destination end-station has received the message. The destination end-station transmits an S-BLEEP regardless whether or not an R-BLEEP signal is observed. Since the time slots for an R-BLEEP and an S-BLEEP do not overlap, the selective relay will always be able to detect the S-BLEEP sent by the receiving end-station, if one is sent. When the relay detects the S-BLEEP signal, the selective relay will refrain from repeating the message, thereby conserving bandwidth.

In alternate embodiments of the present invention, the selective relay or the destination end-station, or both, perform a redundancy check on the received message and transmit an R-BLEEP or an S-BLEEP, respectively, only if the message is received error-free. Thus, if the destination end-station detects an error and refrains from transmitting an S-BLEEP, a selective relay in accordance with the present invention that has received the message error-free will transmit an R-BLEEP to the source end-station and then repeat the message to the destination end-station. If neither an R-BLEEP nor an S-BLEEP is detected by the source end-station because both the relay and the destination end-station detected errors in the received message, the source end-station will schedule the message for retransmission.

FIGS. 3–6 are logical flow diagrams that illustrate the operation of selective relays, source end-stations and destination end-stations in a computer network according to the present invention.

Figure 3:
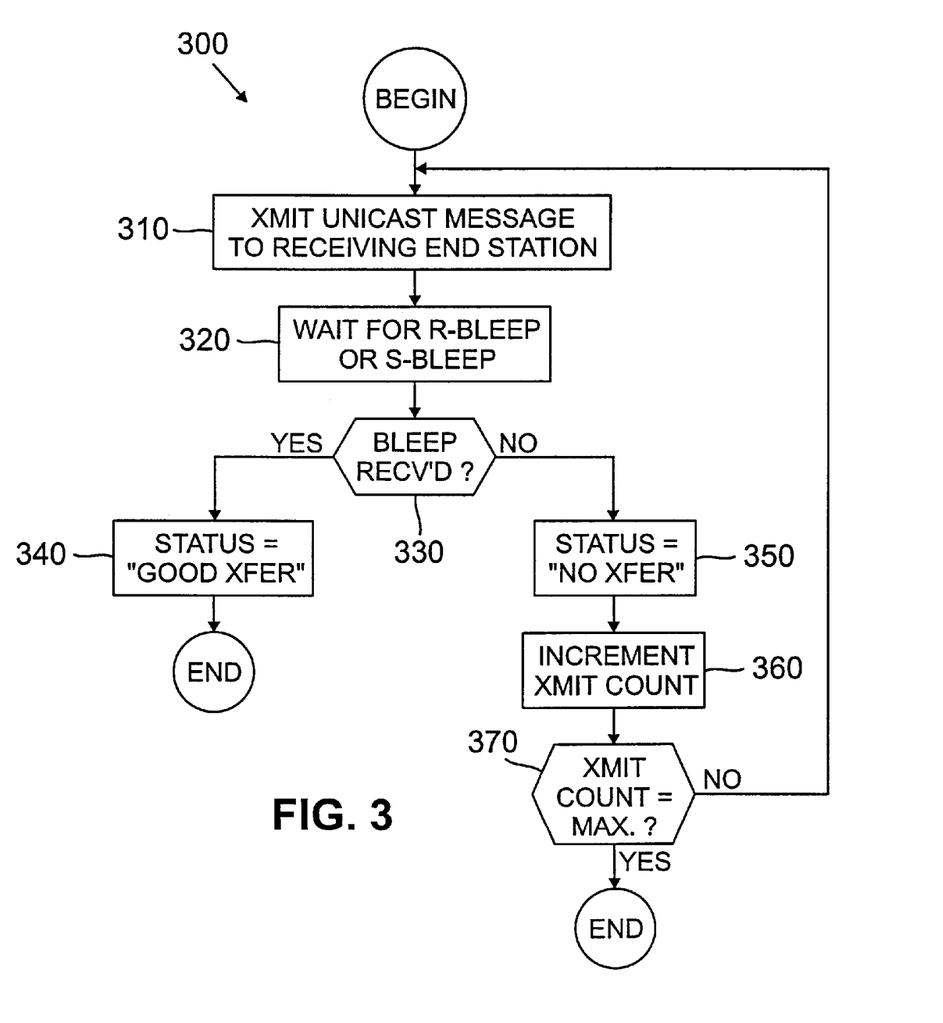
FIG. 3 is a flowchart illustrating the behavior of a transmitting end-station according to one embodiment of the present invention.

FIG. 3 depicts flow chart 300, which illustrates the operation of a source end-station transmitting a unicast message to a destination end-station. After transmitting the message (Step 310), the source end-station waits momentarily to detect either an R-BLEEP or an S-BLEEP, or both, in the WIFS (Steps 320 and 330). If no BLEEP message is received, the source end-station reports the status "NO TRANSFER" for the message (Step 350).

In order to avoid endless retransmission of a message, the source end-station maintains a count of the number of transmissions of a particular message. When the transmission count reaches a maximum value, the source end-station ceases retransmission of the message and marks the message "undelivered" (Steps 360 and 370). If the transmission count is below the maximum value, the source end-station will schedule the message for retransmission (Step 310). A source end-statio transmitting a multicast message will not wait for a BLEEP signal.

Figure 4:
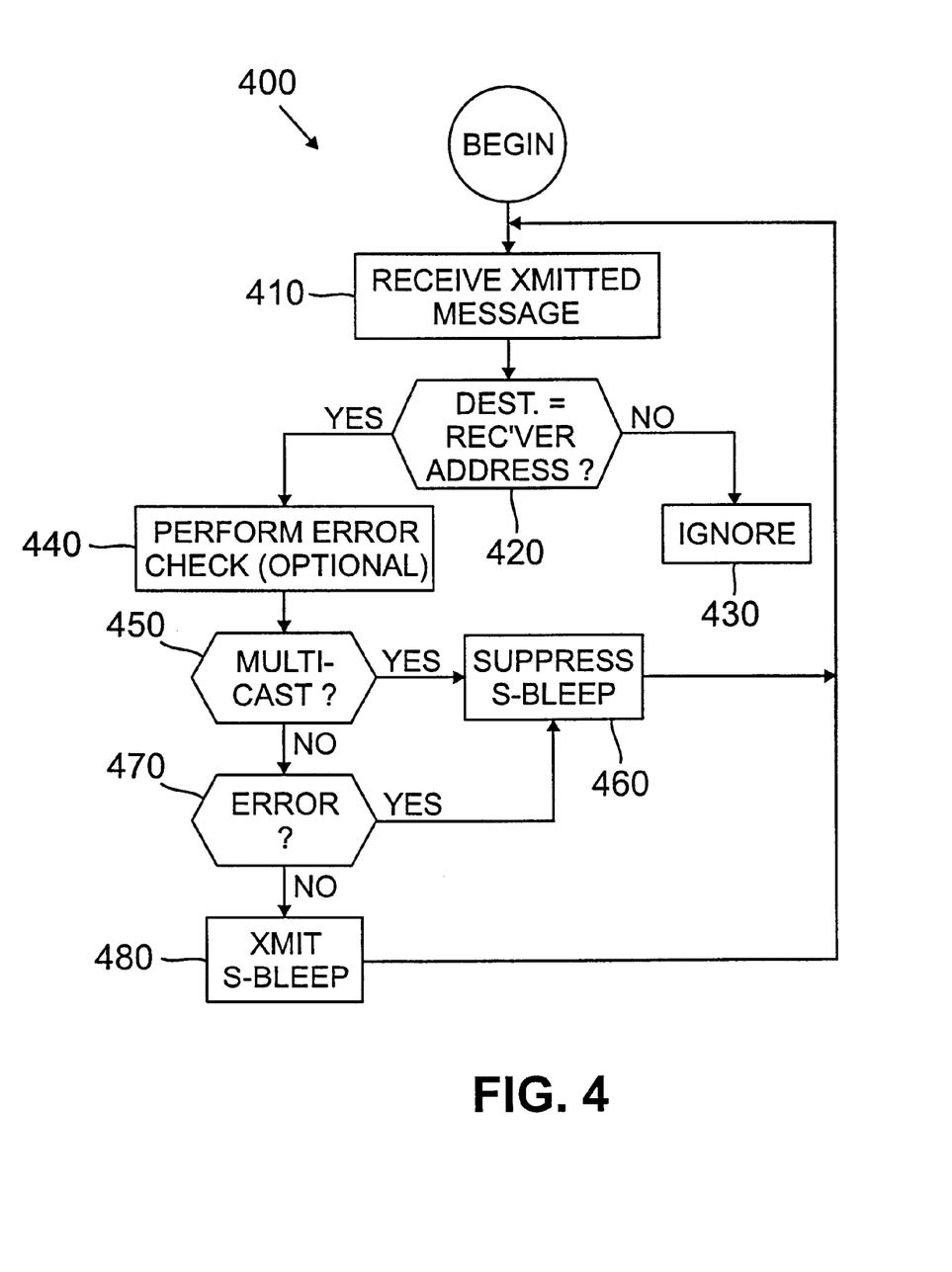
FIG. 4 is a flowchart illustrating the behavior of a receiving end-station according to one embodiment of the present invention.

FIG. 4 depicts flow chart 400, which illustrates the operation of a destination end-station receiving a unicast message. After receiving a message (Step 410), the destination end-station verifies the address information in the header set (Step 420). If the recipient address in the header is not the same as the destination end-station's address, the destination end-station will ignore the message (Step 430).

If, however, the address in the header set corresponds to the destination end-station's address and the message is a unicast message, the destination end-station will transmit an S-BLEEP after an appropriate delay to allow any intervening R-BLEEP to be transmitted. If the destination end-station determines that the message is a multicast or broadcast message, the destination end-station will suppress the S-BLEEP (Steps 450, 460 and 480). Optionally, the destination end-station may perform a redundancy error check to verify that the message was received error free. In not, the destination end-station suppresses the S-BLEEP (Steps 440 and 470).

Figure 5A:
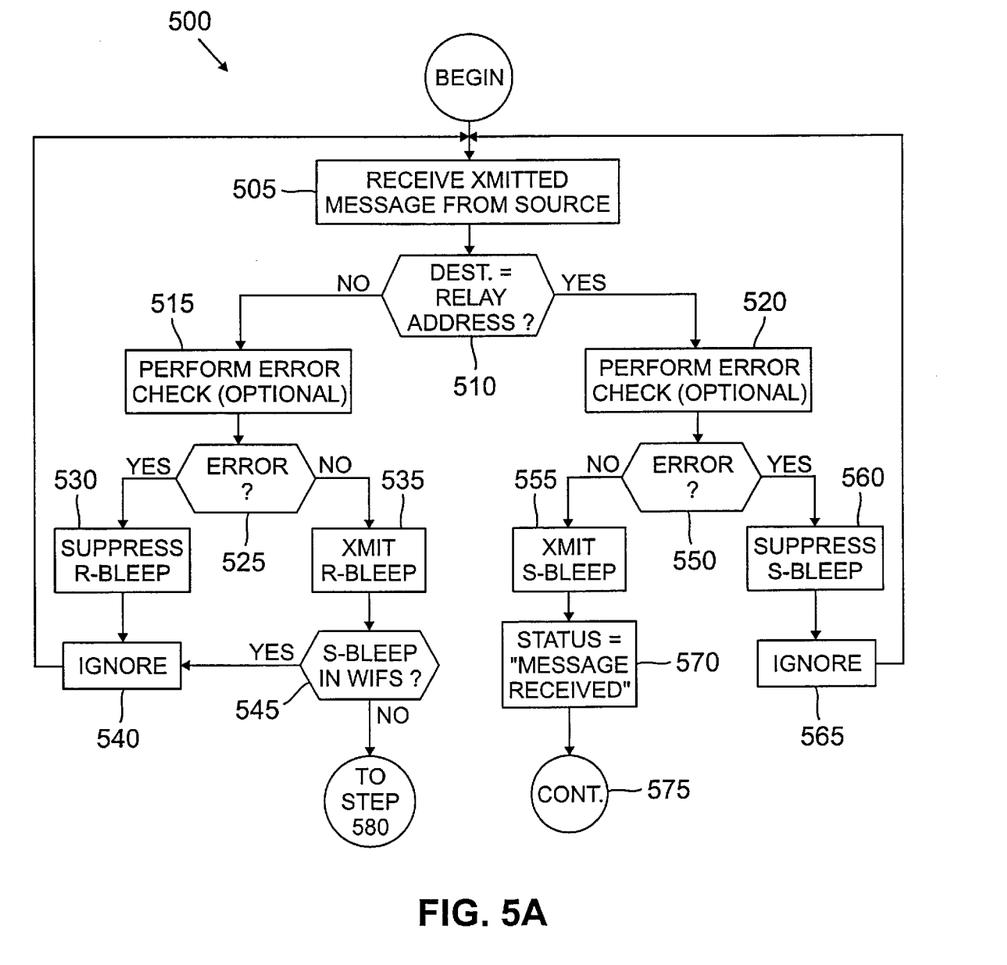
FIG. 5 is a flowchart illustrating the behavior of a plain relay according to one embodiment of the present invention.
Figure 5B:
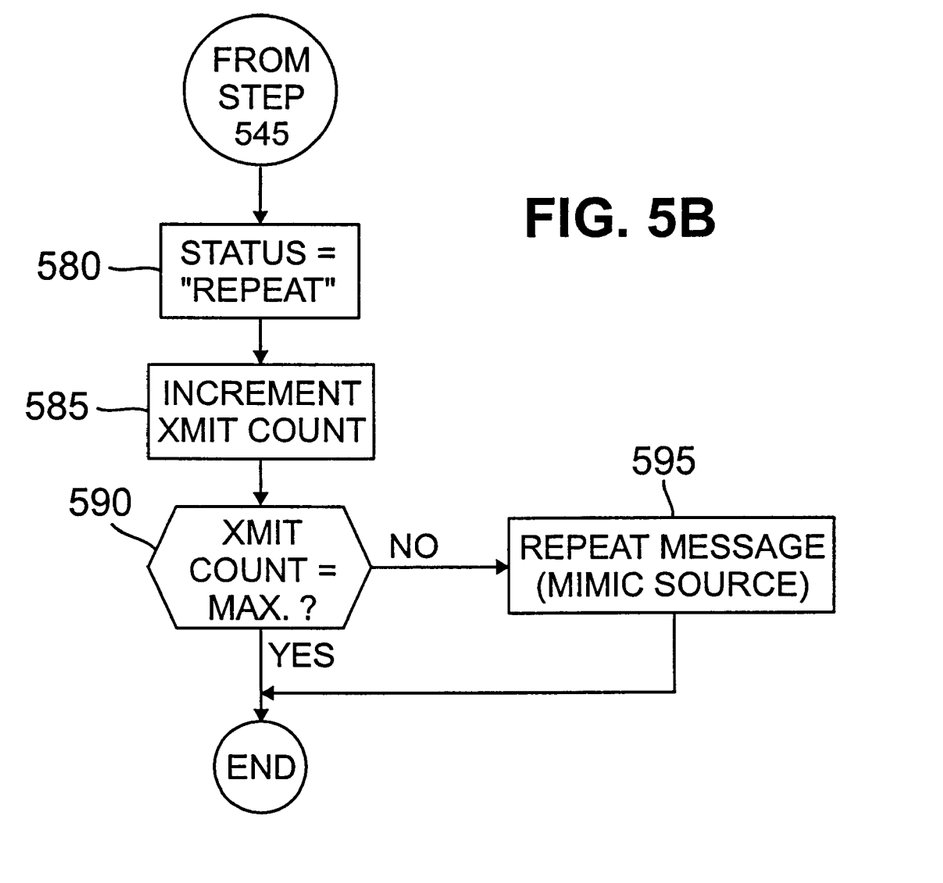

FIG. 5 depicts flow chart 500, which illustrates the operation of a plain relay receiving a unicast message (a plain relay will repeat all multicast messages, without looking for S-BLEEP signals). A plain relay may act as an end-station in addition to its role as a relay. After receiving a unicast message (Step 505), the relay verifies the address information in the header set (Step 510). If the recipient address in the header is not the same as the relay's address, the relay transmits an R-BLEEP (Step 535) and looks to see if an S-BLEEP occurs in the WIFS after the R-BLEEP (Step 545).

Optionally, the relay may perform a redundancy error check to verify that the message was received error-free (Steps 515 and 525). If the message contains an error, the relay suppresses the R-BLEEP (Step 530) and further ignores the message (Step 540). If the message does not contain an error, the relay transmits an R-BLEEP (Step 535), as before, and verifies that an S-BLEEP occurs in the WIFS after the R-BLEEP (Step 545).

If an S-BLEEP does occur in the WIFS after the R-BLEEP, the relay ignores (i.e., does not repeat) the message, because the destination end-station has received the message (Step 540). The non-repetition of the message advantageously conserves bandwidth. If, however, the selective relay does not detect an S-BLEEP in the WIFS, the relay determines that the destination end-station did not receive the message and sets the status of the message to "REPEAT" (Step 580). The selective relay then retransmits the message in the same manner as the source end-station, namely, the relay maintains a transmission count to avoid endless retransmission of the message (Steps 585 and 590) and retransmits the message using the original source address of the source end-station (Step 595). By mimicking the source end-station in this manner, the re-transmitted message is indistinguishable from the original message transmitted by the source end-station.

Returning to Step 510, if the recipient address in the header is the same as the relay's address, the relay transmits an S-BLEEP (Step 555), and then reports the status of the message as "MESSAGE RECEIVED" (Step 570). Since the message was intended for the relay, the message is then forwarded on to the other functions of the relay for further processing (Step 575). In the described situation, the relay must transmit an S-BLEEP, and not merely an R-BLEEP, because it is possible that another relay (a non-destination relay) can also hear the message. In such a case, the non-destination relay would not hear the R-BLEEP sent by the intended destination relay because the non-destination relay would be transmitting its own R-BLEEP at about the same time. Unless an S-BLEEP was sent by the intended destination relay, the non-destination relay would then incorrectly repeat the message despite the fact that it was correctly received by the intended destination relay.

Optionally, the relay may perform a redundancy error check to verify that the message was received error-free (Steps 520 and 550). If the message contains an error, the relay suppresses the S-BLEEP (Step 560) and further ignores the message (Step 565). If the message does not contain an error, the relay transmits an S-BLEEP (Step 555), as before, reports the status of the message as "MESSAGE RECEIVED" (Step 570), and forwards the message to the other functions of the relay for further processing (Step 575).

Figure 6A:
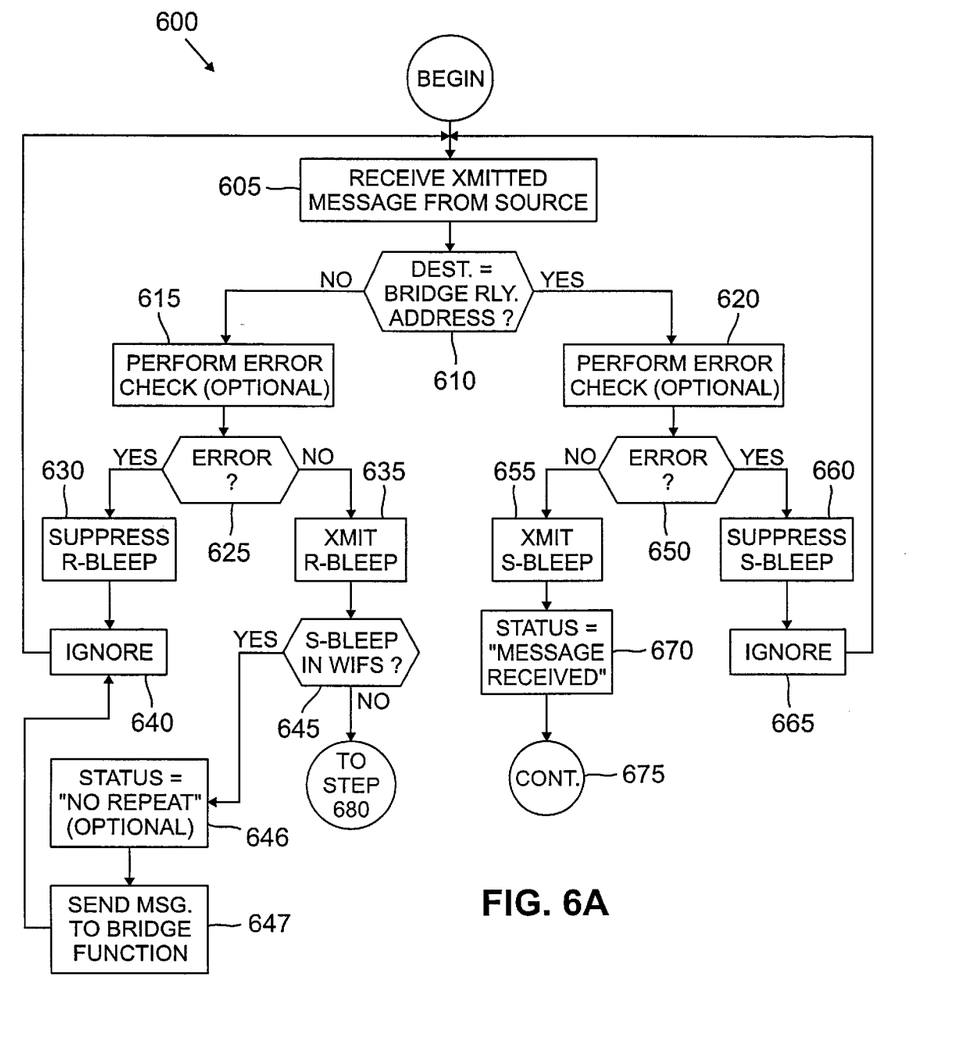
FIG. 6 is a flowchart illustrating the behavior of a bridging relay according to one embodiment of the present invention.
Figure 6B:
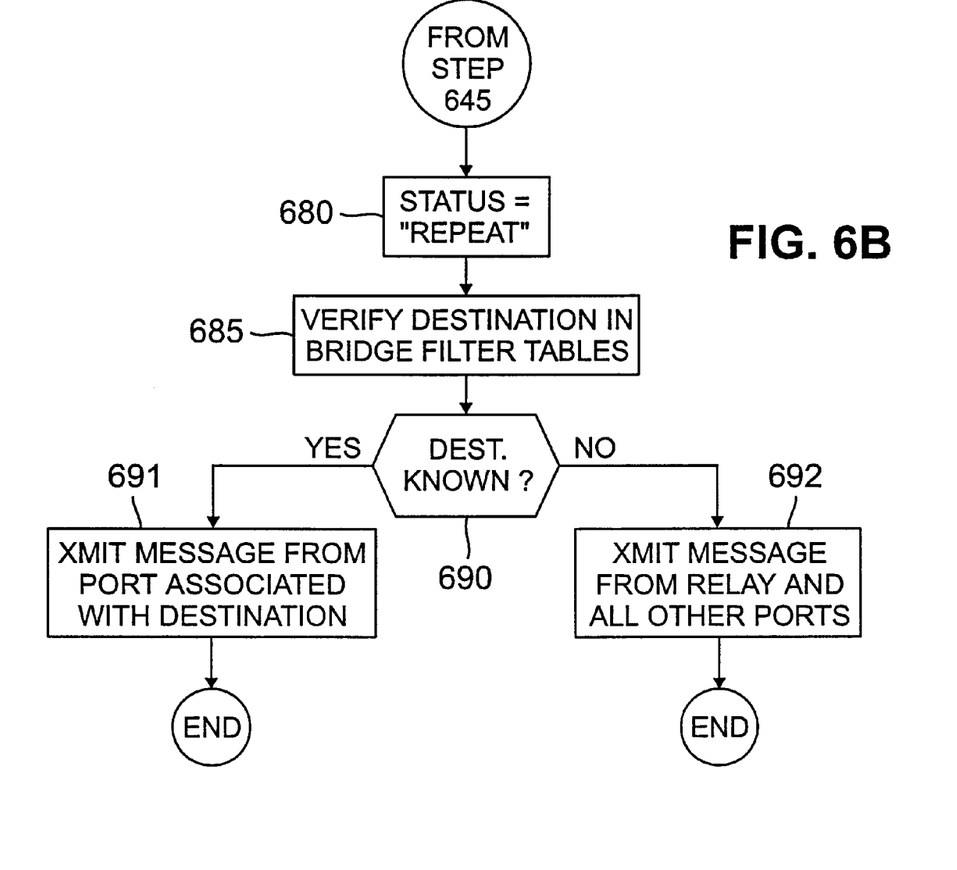

FIG. 6 depicts flow chart 600, which illustrates the operation of a MAC bridge relay receiving a unicast message (a bridge relay will repeat all multicast messages, without looking for S-BLEEP signals). A bridge relay may act as an end-station in addition to its role as a relay. After receiving a unicast message (Step 605), the bridge relay verifies the address information in the header set (Step 610). If the recipient address in the header is not the same as the bridge relay's address, the bridge relay transmits an R-BLEEP (Step 635) and looks to see if an S-BLEEP occurs in the WIFS after the R-BLEEP (Step 645).

Optionally, the bridge relay may perform a redundancy error check to verify that the message was received error-free (Steps 615 and 625). If the message contains an error, the bridge relay suppresses the R-BLEEP (Step 630) and further ignores the message (Step 640). If the message does not contain an error, the bridge relay transmits an R-BLEEP (Step 635), as before, and verifies that an S-BLEEP occurs in the WIFS after the R-BLEEP (Step 645).

If an S-BLEEP does occur in the WIFS after the R-BLEEP, the bridge relay may optionally report a status of "NO REPEAT" and send the received message to the bridge function (Steps 646–647). The bridge relay then ignores (i.e., does not repeat) the message, because the destination end-station has received the message (Step 640). Again, the non-repetition of the message advantageously conserves bandwidth. If, however, the bridge relay does not detect an S-BLEEP in the WIFS, the relay determines that the destination end-station did not receive the message and sets the status of the message to "REPEAT" (Step 680)

The selective bridge relay then forwards the message to the bridge relay function and examines the bridge filter tables to determine if the destination end-station address is in the filter table (Steps 685 and 690). If the destination end-station is found, the message is retransmitted from the port on the bridge associated with the destination end-station (Step 691). If the destination end-station is not known, the message is retransmitted by the bridge relay and all other ports on the relay bridge (Step 692).

Returning to Step 610, if the recipient address in the header is the same as the bridge relay's address, the bridge relay transmits an S-BLEEP (Step 655), and then report the status of the message as "MESSAGE RECEIVED" (Step 670). Since the message was intended for the relay, the message is then forwarded on to the other functions of the bridge relay for further processing (Step 675). As previously explained, the relay must transmit an S-BLEEP, and not merely an R-BLEEP, because it is possible that another relay (a non-destination relay) can also hear the message. In such a case, the non-destination relay would not hear the R-BLEEP sent by the intended destination relay because the non-destination relay would be transmitting its own R-BLEEP at about the same time. Unless an S-BLEEP was sent by the intended destination relay, the non-destination relay would then incorrectly repeat the message despite the fact that it was correctly received by the intended destination relay.

Optionally, the bridge relay may perform a redundancy error check to verify that the message was received error-free (Steps 620 and 650). If the message contains an error, the relay suppresses the S-BLEEP (Step 660) and further ignores the message (Step 665). If the message does not contain an error, the relay transmits an S-BLEEP (Step 655), as before, reports the status of the message as "MESSAGE RECEIVED" (Step 670), and forwards the message to the other functions of the bridge relay for further processing (Step 675).

Although the present invention has been described in detail, those skilled in the art should understand that they can make various changes, substitutions and alterations herein without departing from the spirit and scope of the invention in its broadest form.

What is claimed is:

1. For use in a wireless computer network having a radio relay capable of transmitting messages, a system, operable with said radio relay, for selectively repeating a unicast message received from a source end-station only upon some indication that a destination end-station has not received said message, said system comprising:

a transceiver that receives said unicast message from said source end-station; and control circuitry, coupled to said transceiver, that determines whether said destination end-station has received said unicast message by monitoring said transceiver for receipt of an acknowledgment from said destination end-station, said destination end-station refraining from acknowledging said unicast message based on errors contained therein, and causes said transceiver to refrain from repeating said unicast message if said destination end-station has received said unicast message, said radio relay thereby freed from repeating already-received unicast messages.

2. The system as recited in claim 1 wherein said destination end-station refrains from acknowledging said unicast message if said destination end-station fails to confirm that said unicast message is error-free.

3. The system as recited in claim 1 wherein said control circuitry is capable of causing said transceiver to acknowledge said unicast message, said control circuitry causing said transceiver to refrain from acknowledging said unicast message if said control circuitry fails to confirm that said unicast message is error-free.

4. The system as recited in claim 1 wherein said control circuitry causes said transceiver to repeat a multicast message received from said source end-station without regard as to whether said destination end-station has received said multicast message.

5. The system as recited in claim 1 wherein said control circuitry is coupled to a wire-based local area network (LAN) via a bridge, said control circuitry transmitting said unicast message to said LAN via said bridge without regard as to whether said destination end-station has received said unicast message.

6. The system as recited in claim 1 wherein said control circuitry is coupled to a wire-based local area network (LAN) via a bridge, said LAN receiving said unicast message from said control circuitry via said bridge without regard as to whether said destination end-station has received said unicast message, said LAN further searching a bridge filter table associated therewith for a destination address corresponding to said destination end-station.

7. For use in a wireless computer network having a radio relay capable of transmitting messages, a method, operable with said radio relay, of selectively repeating a unicast message received from a source end-station only upon some indication that a destination end-station has not received said message, said method comprising the steps of:

receiving said unicast message from said source end-station;

determining whether said destination end-station has received said unicast message by monitoring for receipt of an acknowledgment from said destination end-station, said destination end-station refraining from acknowledging said unicast message based on errors contained therein; and refraining from repeating said unicast message if said destination end-station has received said unicast message, said radio relay thereby freed from repeating already-received unicast messages.

8. The method as recited in claim 7 further comprising the step of refraining from acknowledging said unicast message if said destination end-station fails to confirm that said unicast message is error-free.

9. The method as recited in claim 7 further comprising the step of refraining from acknowledging said unicast message if said radio relay fails to confirm that said unicast message is error-free.

10. The method as recited in claim 7 further comprising the step of repeating a multicast message received from said source end-station without regard as to whether said destination end-station has received said multicast message.

11. The method as recited in claim 7 wherein said radio relay is coupled to a wire-based local area network (LAN) via a bridge, said method further comprising the step of transmitting said unicast message to said LAN via said bridge without regard as to whether said destination end-station has received said unicast message.

12. The method as recited in claim 7 wherein said radio relay is coupled to a wire-based local area network (LAN) via a bridge, said method comprising the steps of:

receiving said unicast message from said radio relay into said LAN via said bridge without regard as to whether said destination end-station has received said unicast message; and searching a bridge filter table associated therewith for a destination address corresponding to said destination end-station.

13. A wireless computer network, comprising:

a wire-based local area network (LAN) having a server and a backbone;

a plurality of bridges coupled to said backbone; and a corresponding plurality of radio relays coupled to said plurality of bridges and capable of transmitting unicast and multicast messages among a plurality of source and destination end-stations, each of said corresponding plurality of radio relays including a system for selectively repeating a unicast message received from a source end-station only upon some indication that a destination end-station has not received said unicast message, said system including:

a transceiver that receives said unicast message from said source end-station; and control circuitry, coupled to said transceiver, that determines whether said destination end-station has received said unicast message by monitoring said transceiver for receipt of an acknowledgment from said destination end-station, said destination end-station refraining from acknowledging said unicast message based on errors contained therein, and causes said transceiver to refrain from repeating said unicast message if said destination end-station has received said unicast message, said radio relay thereby freed from repeating already-received unicast messages.

14. The network as recited in claim 13 wherein said destination end-station refrains from acknowledging said unicast message if said destination end-station fails to confirm that said unicast message is error-free.

15. The network as recited in claim 13 wherein said control circuitry is capable of causing said transceiver to acknowledge said unicast message, said control circuitry causing said transceiver to refrain from acknowledging said unicast message if said control circuitry fails to confirm that said unicast message is error-free.

16. The network as recited in claim 13 wherein said control circuitry causes said transceiver to repeat a multicast message received from said source end-station without regard as to whether said destination end-station has received said multicast message.

17. The network as recited in claim 13 wherein said control circuitry transmits said unicast message to said LAN via a corresponding one of said plurality of bridges without regard as to whether said destination end-station has received said unicast message.

18. The network as recited in claim 13 wherein said LAN receives said unicast message from said control circuitry via a corresponding one of said plurality of bridges without regard as to whether said destination end-station has received said unicast message, said LAN searching a bridge filter table associated therewith for a destination address corresponding to said destination end-station.

* * * * *